(No Model.)
W. W. GRISCOM.
AUTOMATIC CIRCUIT CLOSER FOR SECONDARY BATTERIES.
No. 374,673. Patented Dec. 13, 1887.
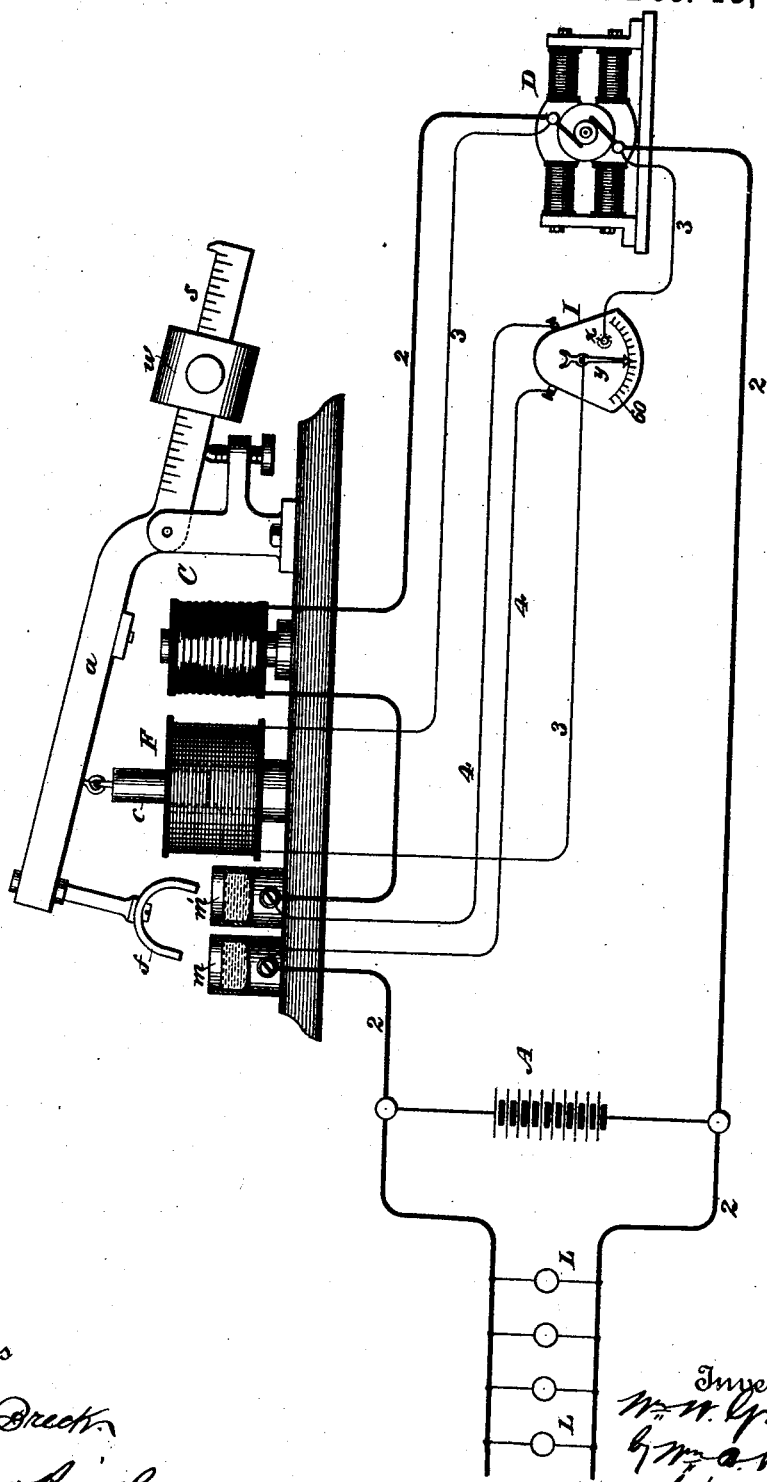
Witnesses
Geo. W. Breck.
Geo New Kirk
Inventor
Wm. W. Griscom
by Wm. A. Vanuxem,
his Attorney.

UNITED STATES PATENT OFFICE.

WILLIAM W. GRISCOM, OF HAVERFORD COLLEGE, PENNSYLVANIA, ASSIGNOR TO THE ELECTRICAL ACCUMULATOR COMPANY, OF NEW YORK.

AUTOMATIC CIRCUIT-CLOSER FOR SECONDARY BATTERIES.

SPECIFICATION forming part of Letters Patent No. 374,673, dated December 13, 1887.

Application filed September 8, 1887. Serial No. 249,073. (No model.)

*To all whom it may concern:*

Be it known that I, WILLIAM W. GRISCOM, a citizen of the United States, and a resident of Haverford College, in the county of Montgomery and State of Pennsylvania, have invented certain new and useful Improvements in Automatic Circuit-Controllers, of which the following is a specification.

My invention is an improvement in automatic circuit-controllers, and is adapted to control or govern the current flowing in a circuit containing a secondary battery or accumulator and a primary generator, as a dynamo-electric machine, operating to charge the battery.

In my arrangement of apparatus the current of charge can only be fully established when there is an effective electro-motive force from the dynamo of the proper polarity, and should a return-current from the battery be established at any time the resistance of the circuit will, by reason of such counter-current, be rendered sufficient to avoid injury to the coils of the dynamo. I provide a solenoid of fine wire actuating an iron core which is located in a separate circuit connecting the poles of the dynamo. There is also an electro-magnet of coarse wire in the main circuit. These magnets have armatures fixed to a pivoted lever operating a switch in the main circuit. To this switch is connected a high-resistance circuit containing a polarized electro-magnet. This magnet is normally in the main circuit and controls break-points in the circuit containing the fine-wire coil, which points are only closed when the electro-motive force from the generator is in the proper direction to charge the battery and has risen to a predetermined point. After starting the dynamo and when the electro-motive force is as described, the circuit of the fine-wire coil is closed. This coil attracts its armature, which draws down the pivoted lever, operating the switch to cut out the polarized magnet, the contact-points of which are thus opened. Circuit, however, is now complete through the coarse-wire coil, which attracts its armature and holds the pivoted lever in position as long as there is an effective charging-current flowing. Should the current fall to zero or reverse, the coarse-wire coil releases its armature, the pivoted bar is retracted, the switch operated, and the high-resistance circuit containing the polarized electro-magnet is introduced into the main circuit. The electro-motive force, being too low or of opposite effect, does not operate the polarized magnet, and the circuit remains in this condition until an effective electro-motive force from the dynamo is again established. The introduction of this high resistance into the circuit prevents injury to the dynamo from any reverse current.

The accompanying drawing illustrates my invention.

D is a dynamo for charging the accumulators A, feeding lamps L. The dynamo and accumulator are connected in circuit 2.

F is an electro-magnet having a fine-wire coil located in a separate circuit, 3, connecting the poles of the dynamo. Armature $c$ is fixed to the pivoted lever $a$, having a gravity retractor, $w$, moving over a graduated scale, $s$. This adapts it for use as a current-measuring instrument, in which case the mercury-cups are connected temporarily by a switch. (Not shown.)

C is a coarse-wire coil permanently in the main circuit. Its armature is also fixed to the lever $a$. A switch consisting of mercury-cups $m\ m'$ and a fork, $f$, dipping into both $m$ and $m'$, is arranged to operate in the main circuit 2 under control of lever $a$. A polarized electro-magnet of high resistance, I, which may be a voltmeter, is connected in a circuit joining the mercury-cups $m\ m'$. The magnet I operates contact-points $x\ y$ in the circuit 3, which contains magnet F.

The operation of the apparatus is as follows: When the dynamo and battery are first connected together, the apparatus will be in the position shown, except that the needle $y$ will indicate the electro-motive force of the battery, taking up a position toward the point 60. As the dynamo starts into operation its electro-motive force gradually rises until it overcomes that due to the charge remaining in the battery, bringing the needle toward zero. The fixed contact $x$ is in a position beyond zero, toward which the needle or contact $y$ will be carried by the electro-motive force due to the dynamo, and when the electro-motive force reaches a predetermined height above that of the battery and in the opposite direction contact between $x$ and $y$ is made, closing the circuit 3. Current then flows from the dynamo through circuit 3. Solenoid F is energized and attracts its core c, drawing down lever a until fork f enters mercury-cups m m'. This closes the main circuit, energizing magnet C, which attracts its armature and holds the lever a in the position to which it was brought by magnet F. The closing of switch f m, however, has cut out circuit 4, thus allowing points x y to separate and open circuit 3. Magnet C now carries the entire current, and should the effective strength of current from the dynamo fall to a point where magnet C would be insufficiently excited to hold lever a, the points will immediately assume their normal position, as shown in the drawing. The introduction of high-resistance circuit 4 will avoid possible injury to the dynamo by reason of the return-current.

What I claim, and desire to secure by Letters Patent, is—

1. The combination of a primary generator and a secondary battery in one circuit, having a switch or circuit-closer operated by two magnets, one located in the main circuit and one in a separate circuit, and a polarized electro-magnet normally in the main circuit, operating a switch or circuit-closer in said separate circuit.

2. The combination of a dynamo-electric machine and a secondary battery in one circuit, having a switch or circuit-closer operated by two magnets, one located in the main circuit, and one in a separate circuit, and a polarized electro-magnet normally in the main circuit, operating a switch or circuit-closer in the separate circuit upon the establishment of an effective electro-motive force from the dynamo.

3. The combination of a dynamo-electric machine, a secondary battery, and a switch or circuit-closer in one main circuit, an electro-magnetic coil in the main circuit, and an electro-magnetic coil in a separate circuit operating the said circuit-closer, and a polarized electro-magnet operating a circuit-closer in the separate circuit, said magnet being introduced and withdrawn with respect to the main circuit by the operation of the first-named switch.

4. The combination of a primary generator, a secondary battery, and a switch or circuit-closer in one main circuit, an electro-magnetic coil in the main circuit, and an electro-magnetic coil in a separate circuit operating the said circuit-closer, with a high-resistance circuit or branch introduced or withdrawn with respect to the main circuit by the operation of the switch or circuit-closer.

5. The combination of a primary generator, a secondary battery, and a switch or circuit-closer in one main circuit, an electro-magnetic coil in a separate branch or circuit for operating said switch, and a polarized electro-magnet in the main circuit operating a circuit-closer in the separate circuit.

6. The combination of a primary generator, a secondary battery, and a switch or circuit-closer in one main circuit, an electro-magnet in a separate branch or circuit for operating said switch, and a polarized electro-magnet operating a circuit-closer in the separate circuit, said magnet being introduced and withdrawn with respect to the main circuit by the operation of the first-named switch.

7. The combination of a primary generator, a secondary battery, and a switch or circuit-closer in one main circuit, an electro-magnet for operating said switch, and a high-resistance circuit or branch introduced or withdrawn with respect to the main circuit by the operation of the said switch.

Signed at the city of New York, in the county of New York and State of New York, this 6th day of September, A. D. 1887.

WM. W. GRISCOM.

Witnesses:
DANIEL E. DELAVAN,
WM. B. VANSIZE.